United States Patent [19]

David

[11] Patent Number: 4,818,324

[45] Date of Patent: Apr. 4, 1989

[54] METHOD OF FABRICATION OF THIN COMPRESSIBLE MATTRESSES

[76] Inventor: Constant V. David, 4952 Field St., San Diego, Calif. 92110

[21] Appl. No.: 95,238

[22] Filed: Sep. 11, 1987

[51] Int. Cl.$^4$ ............... B32B 31/06; B32B 31/08; B32B 31/10; A47C 27/08

[52] U.S. Cl. ................... 156/292; 156/300; 156/301; 156/552; 5/449

[58] Field of Search ............... 5/449, 450, 446; 156/292, 301, 300, 147, 552; 198/537, 550.3, 550.4

[56] References Cited

U.S. PATENT DOCUMENTS

| | | | |
|---|---|---|---|
| 2,372,617 | 3/1945 | Trew | 156/301 X |
| 2,975,822 | 3/1961 | Gent et al. | 156/567 X |
| 3,385,744 | 5/1968 | Shiver, III | 156/330 X |
| 3,429,767 | 2/1969 | Bronstien, Jr. et al. | 156/301 X |
| 3,660,189 | 5/1972 | Troy | 156/292 X |
| 3,708,379 | 1/1973 | Flint | 156/244.11 X |
| 3,928,110 | 12/1975 | Arconti et al. | 156/313 X |
| 4,664,416 | 5/1987 | Steidinger | 156/289 X |

FOREIGN PATENT DOCUMENTS 1234874 6/1971 United Kingdom .

Primary Examiner—Michael W. Ball
Assistant Examiner—Jeff H. Aftergut

[57] ABSTRACT

A method for fabricating thin mattresses and the article manufactured thereby in which small hollow spheres are used for both connecting and separating two parallel layers of a structural material that constitute the mattress surfaces. The spherical shells are generally flexible and are filled with a fluid selected for the article application. The article outer skins or layers are also generally flexible and may be stretchable. The spherical shells make two point-contacts, one with each skin, and become bonded to the skins during the fabrication process. The skins may be air-tight or permeable and even provide built-in passages either through the mattress thickness or from the mattress internal volume to either one of the mattress two sides. The shells are impermeable and may or may not contact one another. In any event, they are not bonded to each other. Depending on the nature of the skin materials, the mattress may be highly flexible, but in all cases is compressible if the shells are also flexible. The use of rigid shells renders the mattress incompressible, although the mattress could be highly flexible. In all instances, the mattress is of very light weight but can still be structurally very strong. Many varied applications may beneficially use such articles.

7 Claims, 1 Drawing Sheet

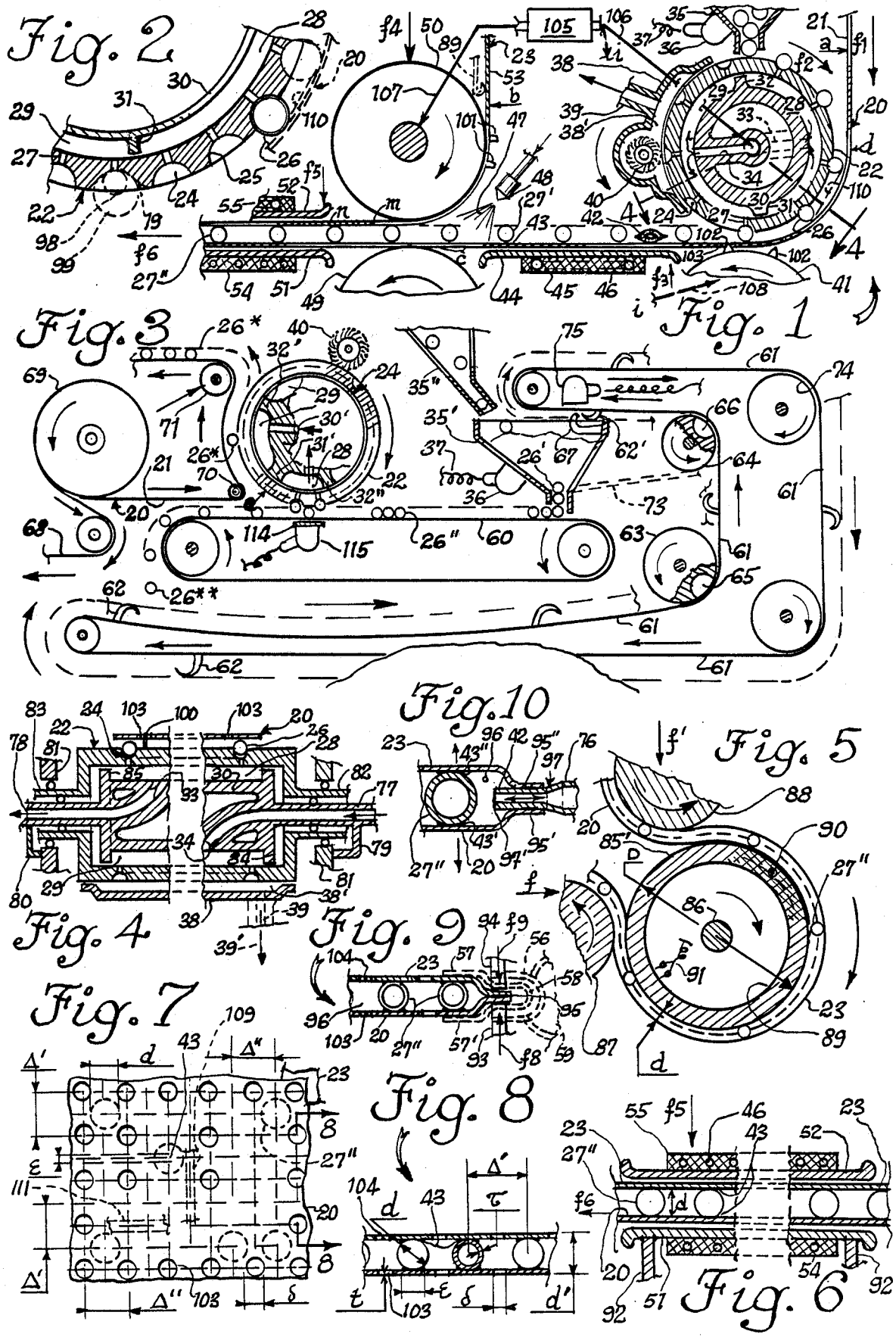

METHOD OF FABRICATION OF THIN COMPRESSIBLE MATTRESSES

BACKGROUND OF THE INVENTION

Many developments in the field of non-metallic materials, especially since World War II, have caused the use of such materials to become very generalized and wisespread for many applications. Such applications range from uses in space, in the medical field and packaging. In all instances, lightweight is required for various reasons, flexibility and/or the ability to conform to various complex shapes without exerting localized loads are needed. Further, strength is also very much desired. The list of additional requirements is long indeed.

Varied needs for specific applications have been met with many different manufactured products such as HONEYCOMB, FOAMED MATERIALS (rigid or flexible), DIMPLED or CORRUGATED SHEETS of a variety of materials, etc. ... Again, the list is long. The product may be made impermeable or permeable as required for the application, impervious to certain chemicals, etc. ... Some materials are molded, others are formed so as to espouse the final shape needed for their use. But, generally, the material shaped to perform a specific function cannot adopt and/or fit varying shapes, as the application may demand in the course of its use.

Consequently, a need exists for improvements in the degree of conformability that the final product or article must display during the life of its application. During such usage lifetime, the product must conserve its original structural and flexural properties, through its shape may have to change hundreds, thousands or even millions of times. Thus, the nature of the basic materials entering into such article fabrication, the structural configuration, the shapes of the structure basic elements and the manner by which these are assembled during the manufacturing process represent important aspects of such fabrication.

SUMMARY OF THE INVENTION

The present invention provides a fabrication method and articles produced thereby designed to satisfy all aforementioned needs. The combination of four basic materials, two pressurizing means of the applied product and of the functional isolating of elemental structures in the used article results in highly versatile products that can be designed to fulfill specific and unique functional requirements of many different applications.

Accordingly, it is an object of the present invention to provide a new and improved fabrication method, and article produced thereby, of mattress-like structures.

It is another object of this invention to provide a fabrication method that enables the combining of four different types of constituting materials.

It is further another object of this invention to provide a fabrication method that enables the structural separation of individual discrete structure elements from the two basic structural components.

It is still another object of this invention to provide a fabrication method that enables quasi-punctual connection of the individual elements to the two structural components.

It is still another object of this invention to provide a fabrication method that enables the formation of two types of cavities inside the article and the separation of said types.

It is still another object of this invention to provide a fabrication method that enables the isolation and sealing of elemental cavity volumes inside the fabricated article.

It is still another object of this invention to provide articles that are erectable by means of pressurization around the individual elemental cavities.

It is still another object of this invention to provide a fabrication method that enables communication between the volume enclosed by the two basic components and around the elemental cavity volumes with the ambient surrounding.

It is finally another object of this invention to provide a fabrication method of the mattress-like structure that is continuous and produces consistent quality and/or property products.

Other products of this invention and many of its attendant advantages will become apparent upon reading of the following description and an examination of the drawings wherein like reference numerals designate like parts throughout.

BRIEF DESCRIPTION OF THE DRAWINGS

FIG. 1 is a schematic illustration of a first embodiment of the fabrication method in which spherical structure elements are dropped in a positioning drum.

FIG. 2 is a partial detailed cross-sectional view of a portion of the sphere-positioning drum.

FIG. 3 is a schematic illustration of a second embodiment of the fabrication method in which the drum attracts the spheres.

FIG. 4 is a partial sectional view of the sphere-positioning drum taken along section line 4—4 of FIG. 1.

FIG. 5 is a schematic cross-sectional view of a heating drum for curing the bonding agent holding the spheres.

FIG. 6 is a schematic cross-sectional view of a flat heating structure for curing the sphere-bonding agent.

FIG. 7 is a plan view of a portion of the completed product showing typical dimensional characteristics.

FIG. 8 is a partial sectional view of the completed product taken along section line 8—8 of FIG. 7.

FIG. 9 is a partial sectional view of a sealed edge of an article produced by the present fabrication method.

FIG. 10 is a partial sectional view of a typical tube connection with the internal volume of the mattress.

DESCRIPTION OF THE INVENTION PREFERRED EMBODIMENTS

Referring now to the drawings and more particularly to FIGS. 1, 2 and 3, a sheet 20 of material coated on side 21 with as adhesive agent is fed continuously in arrow f1 direction. It is guided and restrained during a 90°-turn by holding drum 22 caused to rotate in arrow f2 direction. The external surface of drum 22 is covered with a multiplicity of programmably equidistantly-located hemispherical cavities such as 24 having surfaces 25 that exactly fit the spherical outer surfaces of hollow spheres such as 26. These spheres are attracted or repelled, one at a time, by the suction or repulsive effect created by holes such as 27 alternatively connecting cavities 24 to fixed spaces such as 28 or 29. Spaces 28 and 29 are formed by the cooperation of the inner cylindrical surface of drum 22, the outer surface of fixed drum 30 and the radially-oriented side surfaces of ridges 31 and 32. Sphere 26 attraction and holding occur when the pressure inside space 28 is lower than ambient, sphere release and repulsion occur when the pressure inside space 29 is higher than ambient. Ducts 33 and 34 connect spaces 28 and 29, respectively, to sources of air pressures lower and higher, respectively, than atmospheric pressure. Thus, as drum 22 revolves, holes 27 suck or expel air, causing the sphere suction in or expulsion out of cavities 24. The spheres are supplied by and from a hopper 35 having a chute designed and dimensioned to let spheres out only if and when they have become trapped in a cavity 24, as shown.

A vibrator 36 energized by means of electrical leads 37 insures a constant flow of spheres onto the external surface of drum 22. Ridges 31 and 32, hopper 35 chute and the location where the sphere-loaded sheet leaves its line of tangency with the cylindrical surface to which it was urged to conform up to that point are angularly positioned so as to timely shift from a sucking to an expelling action, and vice-versa, continuously. Shield 38 shaped to follow drum 22 contour is located on the drum side which is free of spheres—facing space 29—and provides the means for sucking foreign particulates and/or extra loose spheres. The vaccuming action is performed by duct 39 in cooperation with rotating brush 40 that helps maintain cavity surfaces 25 clean. Roller 41 positioned under sheet 20 is free to rotate and caused to exert a slight pressure on sheet 20 in arrow f3 direction to insure good contact of the adhesive agent with sphere 26 shells.

As sheet 20 uniformly loaded with spheres such as 27' leaves drum 22, a bonding contact area 43 has already been created between spheres 27' and sheet 20. These quasi-punctual bonding contacts are strengthened by the curing action imposed on the adhesive agent by heat and/or spraying of a curing agent. The former is performed by means of hot plate 44 equipped with heater 45 having heating coils such as 46, for instance. The latter is performed by means of liquid and/or curing agent sprays 47 supplied by nozzles such as 48. Sheet 20 and spheres 27' with their partially-cured bonds reach fixed roller 49 located opposite to roller 50 guided and actuated to exert a slight pressure downward, in arrow f4 direction. A second sheet 23 having its side 53 coated then with an adhesive agent is guided by roller 50 so as to cause its coated side 53 to make contact with the top of spheres 27'. From this point onward, sheets 20 and 23 in cooperation with spheres 27" trapped therebetween have formed the mattress structure.

Curing of the two sphere-to-sheet bonds must then proceed until they have reached the stage at which the adhesive agents and/or the curing agents and/or the bonds have lost their tackiness and are enabled to complete their curing process without further assistance. To that effect, hot plates 51 and 52 maintain the mattress structure at the curing temperature as the completed structure passes by. Both hot plates are heated by heaters 54 and 55, as described above for heater 45. However, plate 51 is fixed but plate 52 and its heater are free to move up and down so as to apply a slight pressure of controllable magnitude in arrow f5 direction on the mattress. The continuous completed cured mattress eventually exists in arrow f6 direction for handling, storing and packaging in a manner well known in the art. Further elaboration is not needed here regarding that final state-of-the-art step.

FIG. 3 presents an alternate invention embodiment in which a belt brings the spheres in position for being attracted by cavities 24 of drum 22. To that effect, spheres 26' contained in hopper 35' are dropped by a chute designed, shaped and dimensioned to let one layer of spheres fall on endless belt 60 that carries them in a position where sucking cavities 24 of drum 22 lift a number of them (26*) into cavities 24 by means earlier described. The ridges 31' and 32' of fixed drum 30' are angularly disposed differently from those of fixed drum 30, as indicated, for reasons easy to see. Ridge 32' could occupy any angular position between 32' and 32". Rotating brush 40 is shown, but shield 38 and suction duct 39 are not shown, for simplicity sake. Feed hopper 35" keeps hopper 35' constantly filled.

Spheres such as 26 that have not been picked up by drum 22 are dropped on a second endless conveying belt 61 equipped with scoops such as 62 and moving in the direction shown by arrows. The scoops are deformable and shaped to retain the spheres trapped therein when belt 61 is caused to make two right-angle turns by means of rollers 63 and 64. These rollers have cavities such as 65 and 66 in which scoops 62 are enabled to nestle. A plurality of fingers 67 mounted on the rim of hopper 35' are shaped and positioned so as to cause the scoops, such as 62', to deform so as to drop their contents of spheres into hopper 35'. Emptied scoops 62' continue their travel, as indicated by the arrows, so as to reassume the position at which they pick up a new load of spheres 26. Vibrator 36 insures a steady dropping of spheres.

In FIG. 3, sheet 20 only is shown. The handling of second sheet 23 of FIG. 1 is identical and is not repeated in FIG. 3. However, the supplying of sheet 20 is shown in greater details. The adhesive agent on side 21 of sheet 20 is prevented from sticking to the other side of sheet 20 by means of a non-stick peel-off foil 68 that is disposed off by means well known in the art, such as a take-up roller. The same type of peel-off foil is used in the handling of sheet 23. Sheet 20 and its associated peel-off foil are supplied and stored as a roll 69. Sheet 20, freed of its protective foil, is caused to apply a slight pressure against spheres 26* retained in cavities 24, between guiding rollers 70 and 71. In all instances, a controlled amount of tension is caused to be applied on sheets 20 and 23 by means not shown here, such as brakes, but well known in the art. At roller 71 station, sheet 20 loaded with spheres 26* makes a turn to assume a horizontal position, whence it is handled similarly to the manner earlier described in FIG. 1 case.

An alternate way of unloading scoops 62' is shown in dotted lines as ramp 73 that is part of hopper 35' modified accordingly. Rollers 64 and 74 are then located higher up so that the edge of ramp 73 is level with the top rim of hopper 35', as one familiar with the art will know. In either sphere unloading approach, the belt and its scoops are vibrated by vibrator 75 to insure a complete emptying out of scoops 62'.

Drum 22 of FIG. 1 is shown, in the form of a developed view of section 4—4, in FIG. 4 where only the ends of the drum are represented. Fixed drum 30 is supported by end shafts 77 and 78. A frame structure 81 fixedly centers these two shafts by means of structural connections 79 and 80. Revolving drum 22 is centered and supported by hollow axles 82 and 83, one axle being driven by means well known in the art, thus not shown here. Axles 82 and 83 are retained by bearings, as shown, for insuring concentricity of drum 22 inner cylindrical surface and of fixed drum 30 body. Spaces 28 and 29 previously identified are quasi-sealed by annular rims 84 and 85 located at the end faces of drum 30.

These two rims cooperate with ridges 31 and 32, and drum 22 inner cylindrical surface, to minimize air leakage between space 28 and 29 volumes, and between either volume and the atmosphere. Shield 38 and duct 39 (the latter shown in dotted lines, not being viewed directly in section 4—4) show how space 38' can be kept at pressures lower than atmospheric by means of the vacuuming action of suction 39'. Rotating brush 40 is not viewed, thus not shown.

FIG. 5 shows a cross-section of a typical heating drum arrangement for providing heat to cure the adhesive or bonding agents. Several of such drums can be mounted in series and positioned to alternatively affect both sides of the mattress. Heating drum 85' is supported and actuated by shaft 86, and is positioned between guiding rollers 87 and 88 located so as to provide the maximum amount of wrapping around heating drum 85'. Heating sleeve 89 houses heating coils 90 energized by electrical lead 91. Such drum configuration replaces heating plates such as 51 and 52, and the associated heaters 54 and 55 (FIG. 1), and fulfills an identical role. Typical dimensions of interest are the drum diameter D and the mattress thickness d, which is approximately equal to the diameter of spheres 27" contained therein. The importance of the relative values of d and D is discussed in the next section. If shaft 86 position is fixed, rollers 87 and 88 may be enabled to adjust their relative positions along arrows f and f', respectively, so as to maintain a constant tension on the moving mattress.

The equivalent of heating drum 85' of FIG. 5 is depicted in FIG. 6 by the ends of heating plate 51-52 assembly partly described previously. Fixed plate 51 is supported by structure 92, but plate 52 is free to move along narrow f5 so that it can apply the slight pressure needed for maintaining sheets 20 and 23 in contact with their corresponding heating plates. Heating plate 52 is prevented from following the mattress on its travel in arrow f6 direction. The curing of bonds such as 43 is usually not fully completed when the mattress structure leaves the heating area but well advanced to a stage from which full curing is achieved within a few hours of storage without further heating.

The finished product or article is illustrated in FIGS. 7 and 8 and depicted with characteristic dimensions. For mattress configurations in which the space between sheets 20 and 23 is not closed but is open to the ambient surroundings, holes come prepunched or cut in sheets 20 and/or 23. In such cases, typical dimensions are: d—sphere or ball diameter, $\delta$—hole diameter, $\Delta'$—hole and ball separation distance between centers in one direction, $\Delta''$—hole and ball separation distance between centers in an orthogonal direction, t—thickness of the sheets, $\tau$—wall thickness of the balls, $d'=d+2t$—total thickness of the mattress structure (assumed to be equal to d as a first approximation), and $\epsilon$—average diameter of the quasi punctual bonding contact area that joins the balls to either sheet. Readers familiar with the art will understand that the hole diameters, the hole abundance, the sheet thickness, the sheet nature, the type and size of the bonding contacts, the ball (and hole) separation distances in both principal directions, and the external surface finish of either sheet may be different for each one of the two sheets 20 and 23, which may also be coated differently.

FIG. 9 indicates how the edge of an article or the two longitudinal edges of a continuous mattress structure could be joined and/or sealed. This fabrication step can be performed before the curing of the bonding agent or adhesive is completed. To that effect, two opposing rollers 93 and 94 exert a pressure on the unsupported edges of sheets 20 and 23 in the directions of arrows f8 and f9 in such a manner that a bonding seam 95 between sheets 20 and 23 results. When such a seam extends around the whole periphery of an article and no holes are present in either sheet, space 96 is then sealed off.

If space 96 is sealed off in an article, it might be desirable to enable the introduction of a fluid into space 96 and the exhaust of such fluid after its specific task is completed, e.g. heat transfer from in or out of the mattress. An exemplary embodiment providing access to space 96 is shown in FIG. 10 in which a pre-inserted end of tube 97 is held by and bonded to the edges of sheets 20 and 23 by means of sealing seams 95' and 95". Ball-to-sheet bonds such as 43' and 43" provide enough strength to oppose the separation of sheets 20 and 23 in the direction of the arrows whenever some slight amount of pressure is created in space 96. Arrow f indicates the possible flow directions of such fluid, two or more such tube connections can be provided for each article. The pressure of the fluid, gas or liquid or vapor, inside balls 27" insures that the mattress will not collapse if suction is applied through tube 97. A plurality of short tube 97 segments can be joined together to a collecting manifold so as to enable large fluid flows to enter or exit through the edges of a mattress structure of relatively small thickness. Other ways of connecting external tubes to space 96 by means of tube flanges bonded to sheets 20 and/or 23, as is well known in the art, may also be used, but might prove less practical in some applications or uses of such article.

OPERATION AND DISCUSSION

The operation and use of articles or products manufactured by means of the presnt invention fabrication method are so common in everyday life that only four typical applications are described below. One first application is shoe inner soles that are beneficially used by some people for comfort and/or health reasons. Soles made with such product will enable breathing of the feet, provided holes are present in sheets 20 and 23. The balls may be filled with water or other liquid (or even visco-plastic semi-solids) that will provide both foot sole shape conformability and elasticity, assuming that the shell material is elastic, e.g. rubber-like. It can be further assumed that a plurality of tubes 97 could be caused to vent outside the shoe so that "foot breathing" could take place with the air surrounding the shoe. Such breathing shoe inner sole could be detachable or be made integral part of the shoe structure.

A second application could be in the medical field, in cases requiring a minimum of localized pressure being applied onto the patient skin, while either heat, cold, fresh air, oxygen or steam, medicated or not, must be applied locally and then disposed of. These articles are often of a disposable type and their costs must consequently be kept low. Readers familiar with the art will easily see how the fabrication method presented herein could provide low cost manufacturing of such articles designed for a specific medical treatment application. Cases in point are burn victims and patients afflicted with bed sores, cited here as well known medical examples.

A third application of a commercial nature is that of liquidfilled mattresses that must conserve the same general thickness, regardless of the mattress orientation, so as to prevent accumulation of liquid at low points of the mattress because of hydrostatic pressure. For instance, at least one surface of the mattress must be flexible so as to enable some external means to urge the thickness of the "fluid mat" to vary in response to local pressure points exerted externally to the mattress. Thus, means must be provided inside the mattress for allowing the free flowing of the fluid throughout the mattress while preventing the effects of the hydrostatic pressure developed thereby to interfere with the externally applied pressure and/or the effects thereof. Pressurized lightweight structures for space application have been developed for providing such mattress-like articles. However, the two skins or sheets of the mattress are linked by interconnecting filaments that need be either woven with the skin fabric or somehow attached or stitched thereto. Manufacturing of such articles is very expensive and more restrictive in terms of material selection than the present fabrication method. Such articles usually cannot provide the feature of resistance to compression that the balls offer, though they occupy a smaller volume when they are not pressurized, e.g. for packaging.

The latter feature is of course of prime importance in space applications, which constitute the fourth potential use of articles produced by the present invention fabrication method. Uncollapsable balls present one drawback that is inherent to the invention article. However, the sphere shells can be made of a semi-porous material that allow a gas such as helium to permeate through when vacuum is applied externally to the balls, inside space 96. In other words, the gas that keeps the balls inflated during the mattress fabrication process is sucked out of the balls by externally-applied vacuum after the mattress is completed and all bonds are cured. When left in a vacuum chamber for a certain amount of time, the helium is extracted and the article is completely deflated. Sheets 20 and 23 have no holes and their edges form a seal 95, as already described. When pressure is then applied inside the mattress, the ball shells collapse as does a voided rubber bladder. The walls of such bladders, hence the ball shells, now constitute the equivalent of the filaments of the space structure aforedescribed. Under such conditions, mattresses fabricated according to the present method could advantageously compete with the more sophisticated filamentary space structures whenever tolerances on the deployed structure thickness are not too exacting. Such is the case for some structure-deploying mechanisms in space. Readers familiar with the art will understand that the gas used to fill the mattress, i.e. spaces 96, cannot under any circumstances re-enter the ball internal spaces, but will instead further collapse the ball shells. Absolute vacuum inside the ball shells is not required to facilitate packaging of such mattress in a capsule to be launched into space.

When curing of bonds 43' and 43" do not require the adjunction of a curing agent by means of nozzles such as 48, the latter can be used to inject a liquid that slowly interact with the ball shell material to make it more permeable to the gas contained therein, or dissolve a sealing film pre-coated thereon. The use of gases less expensive than helium and easier to handle will be then facilitated and insure that gas permeability develops slowly after the mattress is completed, when time is no longer of the essence. Such slow and delayed action corresponds to being enabled to puncture the ball shells when no physical access thereto is possible, after the ball inflation has played its critical and indispensable role during the mattress fabrication process. Hydrogen is more plentiful than helium, thus much cheaper, and could permeate a shell faster than helium. It is also much more dangerous. However, with proper precautions being taken, dangers of explosion could be eliminated.

The list of materials available for entering into the fabrication of such mattress is so long that it is pointless to try to categorize material candidates. The use of and application for the article, its cost, the manner in which it is to be used, etc. are the important deciding factors behind a material selection. For instance, three types of basic materials are mentioned below for some of the applications previously described. Thin leather and/or fabric could be used in the fabrication of inner soles. Ball materials could be latex- or synthetic-rubber-based composites. MYLAR is a very good candidate material for space applications because of its strength and low stretch. Various types of polymeric materials could be used for most commercial applications. Latex impregnated fabric and/or polymeric materials can be used in health-related applications. One sheet or skin of the article could be made with one type of material, whereas the other sheet could be made with another. For instance, leathery materials are preferable when in contact with or close to human skin. One skin could be made stretchable, whereas the other is non-stretchable.

Microballoons or microspheres have been industrially produced for many years in a variety of materials and in various sizes, i.e. diameter and shell thickness ($\tau$), filled or empty. Again, the type of application or use will determine the most appropriate material and the ball size and dimensions. The adhesive agents or bonding materials must be compatible with the ball and the sheet materials so that good ball-sheet bonds result. The balls join two sheets that may be of different materials as mentioned previously. Thus the ball and bond material selection must consider compatibility between three materials and of the curing means or process of either the adhesive agent or the bonding material in case a second part is needed to complete curing, i.e. nature of the sprayed liquid shown as jet 47 in FIG. 1. The variety of satisfactory combinations of materials that are state-of-the-art.

Curing of a polymeric material occurs usually as the result of molecule cross-linking. The process is triggered and sustained by a chemical reaction—e.g. two part-resin, a physical catalytic agent—e.g. heat or radiation, a chemical catalyst—e.g. a chemical in very small proportion that does not contribute significantly to the chemical composition of the final product. Anyone of these curing approaches alone or in combination can be used for either one of the two sheet-ball bonds. A tacky adhesive layer coated on the sheet was chosen to describe earlier how balls could easily be caused to adhere to the sheet. The adhesive layer needs not be pre-coated on the sheet. The layer can be sprayed on the sheets immediately prior to the contacting of the balls, for instance at locations a and b shown in FIG. 1. Such a process may be preferable with some sheet materials such as thin leather for example.

The manner by which balls are attached and held by and on the surface of drum 22 can also be different than that illustrated. For instance, balls could be attracted and then repulsed by an electrical field generated by small electrodes lodged in a cylinder of electrically-isolating material that cannot be electrostatically charged. The ducting of pressurized air and vacuum suction is then replaced by a network of electricity-conducting wires. The balls then need be electrically charged. A simple variation of the embodiment presented in FIGS. 1 to 4 is to change the hemispherical shape of cavities 24 into a conical shape. Such a minor change will enable a drum to handle different ball sizes within a range much larger than that which hemispherical shapes would allow. In FIG. 2, such a conical cavity 19 is shown in dotted lines. Two extreme sizes of balls, shown in dotted line also, are indicated as representing the size range of balls that could be accommodated. The diameter of the small ball 98 size is about two thirds of that of ball 26, whereas the diameter of the largest ball 99 is about twice ball 26 diameter. It is of course obvious that only balls having identical nominal sizes should be considered for a given mattress thickness. Also, the ball separation distances $\Delta'$ and $\Delta''$ cannot be adjusted to match the ball diameter adjustment. Diameter $\delta$ of the venting holes in sheets 20 and/or 23 may be adjusted accordingly. Diameter $\epsilon$ of contact bond 43 will adjust itself. The size of hopper 35 chute and its distance from drum 22 external cylindrical surface must be adjusted to fit each nominal ball size. The vertical position of the structural support of heating plate 44 and roller 41 may have to be adjusted. A slight variation in the inclination of sheet 20 will suffice to accommodate such ball size adjustment. Readers familiar with the art will see why and how the relative position of rollers 49 and 50, and of plates 51 and 52 will also require adjustment. The variation of ball size without a concomitant variation of the ball separation distances brings up the subject of mattress design and dimensinal proportions.

The variable parameters entering in the design or dimensional formulation of a mattress structure, or individual article, were identified earlier. The article application or usage mode helps determine the material choice, as previously mentioned, but also dictates optimum values to be given to those design parameters. The mattress characteristics of most interest here are: (1) the mattress thickness, (2) its degree of conformability to curved surfaces, (3) its degree of flexibility or rigidity in both its inflated and deflated states, (4) its degree of stretchability or lack thereof, (5) the amount of compressive loads it may safely support in both inflated and deflated states, (6) the type and amount of flexural strength that it may provide in an extended inflated state, e.g. when deployed in space, and (7) its ability to withstand environmental conditions and/or its limitations thereabout. Dimensionless design parameters are often useful in analyzing simple structures, such as those of such mattress, and their performances under loads.

For any given combination of materials, the most significant parameters will be: (1) $t/d$, (2) $\Delta'/d$ and $\Delta''/d$, (3) $\delta/\Delta'$ and $\delta/\Delta''$, (4) $\delta/d$, (5) $\epsilon/d$, and to a lesser extent (6) $\tau/t$. The generalized interpretation and significance of these dimensionless parameters is first discussed with the assumption that the sheet materials are essentially non-stretchable and that the sheets or skins have no holes, i.e. case of an inflatable mattress. The inflation pressure is limited by the strength of the ball-skin connections or individual bonds. As a first approximation, $\epsilon/d$ can be considered a constant for a given bonding mode. Thus, the maximum pressure differential acceptable across a sheet depends only on the number of bonds, hence balls, per unit area, for a given bond type. Thus, if all dimensionless parameters remain constant, that pressure differential is independent of the ball size. Sections of the mattress can be considered like beams and follow the same laws relating flexural stiffess to thickness, hence to ball diameter. The compressive strength of the mattress is also independent of the ball size. However, if $\Delta'/d$ and $\Delta''/d$ become close to unity, the compressibility of individual balls becomes a determining factor of the mattress compressive strength. But the mattress flexural stiffness remains hardly affected.

The two considerations above brings up cases of applications in which the flat deflated mattress shape can be urged to become curved along either one single direction or two orthogonal directions (double curvature). This can be done very simply by enabling both sheets to become stretchable in varying degrees, according to direction and differently for each sheet. Another dimenless ratio then gains significance, i.e. $\Delta'/\Delta''$. A second dimensionless ratio becomes important, $d/D$ or its inverse $D/d$, where D represents a measure of the mattress deformation in a set direction. Heating drum 85' of FIG. 5 causes a similar type of deformation during the final curing step of the fabrication of mattress structures that are allowed to thusly deform.

In a second type of applications, compressibility of the article and its flexural stiffness may be assumed to be unrelated. Sheets 20 and/or 23 have holes and ambient air fills spaces 96. Flexural strength of mattress sections does not exist per se and compressibility is provided by the resistance that the balls are enabled to oppose to individual elemental loads tending to squash them. As a first approximation, only balls provide the individual spacing function that the mattress then in turn provides bulkwise. The role of the sheets or skins is reduced to that of connecting means between balls. The ratio $\delta/d$ can approach unity and the mattress skins may freely crease or locally fold or bend to accommodate mattress bending. The amount of loading and its distribution,the combination of both being strongly dependent on the application or use, become the determining design factor. An example is shoe inner soles. Local stiffness of the skins may be needed for maintaining the sole shape and integrity, whether in use or not, but does not contribute much to the load-carrying role of the sole. The local stiffness of the sheet closest to the foot (upper sheet) plays only the role of load-spreading for the ball reaction to being squashed. The ball diameter in combination with ball spacing become a measure of the amount of uneven deformation that comfortable conformance to the foot sole shape requires. One can now see why, how and to what degree the article use or application is of paramount significance. Another extreme case will be that of a mattress destined to isolate the skin of a bedridden patient afflicted by burns or bed sores from being locally pressurized beyond a minimal level. Larger ball diameters would then be more appropriate and the balls need not offer the degreed of resistance to squashing that balls used in a shoe inner sole demand. Both applications are meant to provide more comfort and alleviate pain caused by pressure points but the manner by which such function be optimally performed is totally different.

However, in most mattress design work, the use of dimensionless parameters will prove helpful in comparing various mattress configurations and/or establishing reference performance graphs. Those are designed to present mattress structure characteristics in a form easy to use for conducting a performance analysis of a given mattress design, or estimating the basic dimensions thereof, e.g. $d$, $t$, $\delta$, $\tau$, $\epsilon$, $\Delta'$ and/or $\Delta''$. Also, the nature of various materials used for the sheets, the shells,to fill the shells and/or to bond the shells to the sheets influences the mattress deformation in response to loading rations might be. Such variety is summarized in Table A below.

TABLE A

STRUCTURE CONFIGURATION AND DESIGN CLASSIFICATION

| SHEETS | SHELLS | OPERATING MODE | APPLICATION EXAMPLES |
|---|---|---|---|
| with HOLES (in one or two sheets, same or different) | Hollow, air Filled with "plastics" rubber-like mat'l | Shell flattens* Shell Content is "elastically" deformable | Soft Bed Mattress* Shoe Inner Soles (Shell Filler provides restoring "springiness") |
| have NO HOLES (sheets may be same or differ in mat'l and/or strength, but neither one has holes) | Hollow, air liquid or "plastics" filler | Shells used as spacers of containing walls | Mattress contents flow in and out, e.g. heat exchange |
| | Shells may be evacuated and stretched at deployment | Sheets used as structural members | Mattress contents stay in, fluid under pressure, e.g. space structures |
| | | Sheets used as actuating members | Programmed Shaped Structure on-site deployment |

*the air pressure inside the shell increases as the shell is flattened and that pressure increment applied on the increased contact area between the sheets and the shell generates the restoring force or "springiness" of the mattress.

and/or degree of conformability such as ability to transmit a point load as a distributed load. This deformability aspect of the mattress is important even during its fabrication as is illustrated in FIG. 5 wherein D/d represents a measure of the differential stretching that sheets 20 and 23 must safely be capable of, or of the minimum value to which it may safely be deformed to when a light is imposed upon the sheet differential stretchabilities. The same type of considerations applies to the manner in which the completed structures can or should be stored. Specific aspects of the structure fabrication, yet not mentioned, may now be discussed and/or summarized in conjunction with and in the context of the fulfillment of specific application requirements.

Structure Application/Design/Fabrication Requirement Integration

Typical applications were discussed earlier to show how different and varied the mattress structure configu- Table A above provides a matricized summary of the manner in which the materials and configurations of both sheets and of the shells may and must be combined to best meet the specific requirements of various operational modes of different structure applications. The nature and type of shell-sheet optimum bonding depend on the nature and types of such combinations. This critically affects the fabrication method used and the steps thereof. For instance, if both sheets contain holes, steps must be taken during the fabrication to insure that those holes in both sheets and the shells always become positioned according to the preprogrammed schedule set and imposed by drum 22 of FIG. 1. Also, spraying through those holes could not be tolerated for obvious reasons. At this juncture, it might be useful to construct a similar matrix regarding shell/sheet bonding. It is presented in Table B below in a format compatible with that of Table A.

TABLE B

SHELL-to-SHEET BONDING CLASSIFICATION

| BOND COMPONENTS | BOND FORMATION | CURING | USES and REMARKS |
|---|---|---|---|
| pre-coated adhesive on sheets | by pressure contact | heat or catalyst | applicable to all, weak bond, residual tackiness possible |
| two parts applied at differnt times | by pressure contact with the first part | heat and/or self-curing | second part application impractical if holes in sheets |
| pre-coated non-tacky film on both sheets | solvent-spraying prior to contact | solvent removal (heat or vacuum) | applicable to all, weak bond, no residual tackiness |
| pre-coated adhesive on sheets and film shield | by pressure contact and spraying of dissolved film mat'l | heat or vacuum removal of solvent | impractical if holes in sheets, film isolates the tacky unused adhesive |
| pre-coated non-tacky film on both sheets | by pressure contact after sheet heating | non-tacky when at room temperature | applicable to all, if use at room temperature only |
| two-part adhesive, one part on sheets and one part on balls | heat application and pressure contact, two parts soften and react | heat curing if needed, may not be required | applicable to all, heat curing may enable use at higher temperatures |
| pre-coated and removable adhesive on both sheets and balls | by contact and pressure/heat being applied, unused adhesive dissolved | heat curing of adhesive parts in contact only | cured adhesive parts in contact do not dissolve in bath solvent |

The spraying of either bonding agent or solvent on sheets having holes needs be clarified first, in terms of its impracticability. One can refer to FIG. 1 drawing to that effect. Spraying (or for that matter by means of roller-wetting) must be conducted on a side of the sheet destined to become an inner surface of either one of the two sheets. This means that some of the liquid sprayed or rolled on will either pass or bleed through the sheet holes and become a nuisance. A guard such as 89 shown in dotted lines for shielding roller 50, collecting and evacuating lost sprayed liquid could be used for sprays applied at point b, but seems impractical to use for sprays hitting sheet 20 at points c, for example. The degree of impracticality is represented by a degree of fabrication difficulty, hence of more difficult quality control and eventually higher costs. Only manufacturers of articles produced by means of the present fabrication method will be able to determine the most cost-effective combination of bonding methods and materials, for both balls and sheets, for a given article usage.

Some clarification and explanation words are given below regarding some items stated in Tables A and B, in the order they appear from left to right and from top to bottom in each table. Either sheet or both may have holes. The sizes of the holes may differ between the two sheets that may be of different thickness or consist of different materials. When hollow, the shell is most likely filled with air at atmospheric pressure. the shells may otherwise be filled with foam rubber, solid rubber, various types of thick viscous liquids, a special gas, etc. The balls may provide all of the mattress compressibility and springiness, if spaces 96 around them are vented to the outside (holes in one sheet at least). When the sheets have no holes and the mattress edges are sealed (spaces 96 closed), the balls may serve as spacers to keep the two sheets separated. The shells could also be filled then with a liquid/vapor mixture sensitive to temperature so as to render the mattress compressibility temperature-dependent. Although access to spaces 96 is enabled by tubes 97, fluid flow therein and therefrom may used for totally different purposes such as: (1) at nominal pressure for heat exchanging between the fluid flowing through the mattress and the environment surrounding the mattress, (2) non-flowing fluids at a controllably regulated pressure to inflate the mattress structure into a programmed shape, and (3) non-flowing fluids at a varying pressure to cause a pre-programmed deformation of the mattress structure for providing an actuating motion and/or a positioning function.

Table B content needs be reviewed in the context of Table A, for the shell-sheet bonds constitute an integral part, both functionally and structurally, of the completed in-use structures. A similar approach is followed below for such review. The contacting of balls, pre-positioned by mechanical means, by the pre-coated sheet surfaces has already been extensively described and discussed. The adhesive coating is and remains tacky until the material is cured, at which time the cured adhesive material becomes a strong non-tacky bond material. Heat is a well known way to cause the curing completion of a partially-cured tacky resin so as to remove such tackiness and insure a strong bond. However, more reliable and/or safer ways are also commonly utilized, namely incorporating a volatile solvent in an adhesive material and which can be eliminated by heat, adding a catalyst agent in the adhesive material that becomes activated by heat, or spraying such catalyst agent immediately after contact has been made with the adhesive. The adhesive coating may consist of two-parts, either part or both being sequentially sprayed onto the surfaces. The combination of heat and time causes the formation of a film of non-tacky cured resin that results in strong bonds.

The two components destined to make contact can both be precoated by a non-tacky film that becomes tacky when either heat or a volatile solvent is applied thereon. Each film constitutes the complementary part of a two-part resin, both parts reacting to form a cured resin when brought together, which is what the application of either heat, a solvent or a combination of both causes when contact is then urged between the two films. Shells must be coated with either one of the two-part films. That film part can be a dry non-tacky sealant material at room temperature, soluble in a specific solvent at room temperature. Such specific solvent yet cannot dissolve the resin material formed by the combination of both parts. Thus, the uncured films remaining on the surfaces of both the sheets and the shells that have not yet made contact can be washed off and removed.

This removal action accomplishes two things: (1) it eliminates the risks of undesirable residual local tackiness, and (2) it enables the shell structure to become porous again if such is its nature and which the film coating had previously sealed off. The removal of diluting or cure-inhibiting solvents in the adhesive base material may further be facilitated by the application of vacuum in concurrence with that of heat. In all instances, as is well known in the art, the curing process results from a lengthy chemical reaction that can proceed on its own at room temperature, once a certain degree of molecule cross-linking has been reached. The elimination of a solvent could result in a faster process or could eliminate the need of heat application. In any event, manufacturers of the end products herein described have a wide range of choices of state-of-the-art bonding base-materials, processing methods therefor and/or combinations thereof. Combinations of various fabrication steps can be found among those available choices to ease the handling of the sheets up to the point or step when the presence of the adhesive is required, immediately prior to the shell-to-sheet contacts being made.

Miscellaneous Fabrication Process Items

Some items regarding the fabrication process described and discussed previously have so far been ignored, being either not essential or incidental.They pertain to steps in the fabrication process such as: (1) the alignment and motion synchronization of the sheets, (2) the delineation and/or creation of areas on the sheets for edge-seam-sealing provision, (3) facilitating the feeding process of the balls, (4) establishing a practical limit in the size of balls which can be handled, (5) providing means for preventing mechanical interferences between moving parts that either guide, restrain or contain the three basic materials, i.e of the sheets, the shells and the liquid sprays, and (6) providing means for bending and/or shaping the edge portions of both sheets which are used for forming a continuous seam. These items are briefly described and/or discussed in the order listed above.

At the start of a production run, both sheets must be aligned and positioned relatively to their respective drive drum or roller, i.e. sheet 20 and drum 22, sheet 23 and roller 50, to insure that the sheets will retain their transversal position relative to the drum and roller end faces. Further, if both sheets have holes, the relative positioning of the holes in the two sheets, and relatively to the shell pre-programmed positions, must not shift or be altered. To that effect, drum 22 and roller 50 have protruding spikes such as 100 and 101, respectively, for engaging some holes such as 103 and 104 (FIGS. 4, 7, 8 and 9) in sheets 20 and 23, respectively. The spike/hole engagements assure that the positioning requirements defined above are met at all times during a production run. If the sheets are not supposed to have holes staggerred with the shells, a row of holes is provided near each one of the sheet two edges to mesh with corresponding rows of spikes located on the drum and roller surfaces near their end faces. In all instances, such border areas of the sheets remain free of balls and constitute margin areas used for locating the edge seam 95. The sheets are then driven and kept positioned as do the individual pages of an endless ream of folded sheets, in a continuous printer. Transversally-located margins may also be created by preventing balls from being supplied by drum 22 during small angular portions of its rotation at pre-determined angular intervals so as to provide ball-free transversal margins for locating two transversal sealing seams that complete the enclosure of a set mattress area and volume. Individual mattress pieces can then be sliced off between two adjacent seams at a later stage of the fabrication process.

The programmably scheduled formation of transversal margins can easily be accomplished by programmably interrupting the air suction effect in space 28 at concomitantly adjusted angular positions of drum 22 surface. In addition, space 28 may then become pressurized so as to further enhance ball introduction in cavities 24. This can easily be done by means of a three-way two-position valve properly connected between the sources of compressed air and vacuum, and duct 33, as is well known in the art. Depending on the relative diameters of balls 26 and drum 22, the engagement of spikes 100 with holes 103 may prove unsatisfactory, especially for thin or fragile sheets 20. In such cases, spike-hole engaging should preferably occur when sheet 20 is directly supported by a roller surface, as is the case for sheet 23 and roller 50. To that effect, short spikes 102, such as 101 on roller 50, can be located on roller 41 surface.

In all instances, the angular rotations of drum 22 and roller 50, or of rollers 41 and 50 and drum 22 as the case may require, must be synchronized so as to insure that balls 26 are always appropriately staggerred and positioned with respect to the sheet holes. This can be assured by driving these three rotating members by a common motor 105. Shafts 106, 107 and 108 (as needed) of this motor drive drum 22, roller 50 and roller 41 (as needed), respectively. Sheets 20 and 23 are supplied from rolls (not shown) mounted on axles equipped with brakes which maintain a constant tension on sheets 20 and 23 so as to insure a positive slackless and coordinated advancing of each sheet. Depending on the amount of such tension, the sheet stiffness, the amount of longitudinal spacing of balls 26, etc. . . . sheet 20 could form straight segments such as 110, shown in dotted line in FIG. 1, between transversal rows of balls. As readers familiar with the art will easily recognize, the ball/drum diameter-ratio illustrated in FIG. 2 is much more realistic, and variations in the degree of bending of sheet 20 between transversal rows of balls can practically be ignored. A roller similar to roller 41 and equipped with short spikes could be positioned to make contact with the outer side of sheet 20 at a point such as d where balls 26 first contact sheet 20 tacky side surface.

The minimum ball size usable by the present fabrication method depends on the ease with which balls 26 can be steered in a correct feeding position in and through the feed chute, in the case of FIG. 1 embodiment. The ball-feeding embodiment shown in FIG. 3, however, could accommodate smaller ball sizes, smaller by possibly factors of two to three. Ball diametgers smaller than an eighth of an inch may be difficult to handle in the case of FIG. 1 shell-feeding system, whereas ball diameters as small as 0.050 in. appear realistic in the case of FIG. 3 system. Another important factor relates to the ball material bulk density and nature. Light shells made of materials that become easily electro-statically charged might be attracted by electrostatic forces that are appreciable compared to the shell weight and/or the suction effects. Yet, much smaller balls made of solid rubber could more easily be handled by the same shell-feeding system, for example. Manufacturers will be able to better define such fabrication limitations as experience is gained.

In FIG. 3 embodiment, the chute is configured and dimensioned to let one row of balls fall on endless belt 60. A vibrating slat 114 extending the width of belt 60 and actuated by vibrator 115, may be used to insure that balls 26" become more attractable by the suction effect previously described. Thus all cavities 24 of drum 22 should be enabled to pick up one shell each. A guarding slat extending the length of drum 22 with a scraping edge positioned slightly more than one ball half-diameter away from drum 22 surface at point e can insure that balls attracted onto drum 22 surface are caused to fall back on belt 60 to join balls 26**. In FIG. 1 embodiment, the chute must insure that: (1) one shell is presented in front of each cavity 24 that passes by, but nowhere else, and (2) spikes 100, long enough to engage sheet 20 holes, do not interfere with the left wall of the chute.

The first requirement can be met by inserting spacers between the two vertical parallel walls of the chute in a manner such that all shells are progressively and singularly eased into a correct position. The second requirement exists only if sheet 20 has holes for future venting function, but not when holes are only intended for sheet guidance and drive, then located in the margin portion of sheet 20 into which the chute does not extend. If for whatever reason, the presence of spikes 100 is needed throughout the sheet area, narrow slots can be cut in the chute left wall in the middle of spacer ends so as to provide free passages to the spike tips. The prevention of liquid spray interference with various parts of the machinery used in the structure fabrication was briefly mentioned earlier. The generalized use of guards such as 89 and/or of air-sucking hoods properly located, as is well known in the art will insure that such sprays have no ill effects.

The continuous and automatic formation of sealing seam 95 between two sheet margins necessitates the performance of some additional fabrication operations before the inner surfaces of the sheets have lost their tackiness. Thus at some stage between two typical locations designated as points m and n in FIG. 1, two U-shaped guides such as 56 shown in dotted lines in FIG. 9 are caused to engage the mattress thickness-wise, one guide being positioned along and against each side of the already formed structure and each branch of the U-section being positioned along one of the two structure external surfaces. The U-shaped guides are fixed and the mattress structure advancing motion causes its external surfaces to slide between the two branches of each guide 56. The distance separating the two branches 57 and 57' of guide 56 is caused to decrease in a manner such that: (1) the two margins and/or sheet edges are prevented from creasing, bulging out locally or undulating longitudinally, (2) each margin curves twice to form the two conjugate S-like shapes shown near the right side of FIG. 9, and (3) the two forces pressing along arrows f8 and f9 generated by rolling wheels 93 and 94 complete the closing of whatever gap is left between the two margins upon leaving guide 56 end where the gap between the guide two branches is narrowest. The shapes of the two ends, i.e. entrance and exit, of the U-shaped guide are shown in dotted lines and referred to as 56 and 58. Readers familiar with the art will be able to visualize the narrowing effect that the progressive changes in shape of guide 56 branches have on the sheets margins, i.e. coming closer together as the structure advances along guide 56 length. Those readers will also see how the same technique could be used in the case where only one sheet is being deformed while the other remains flat, as may be preferable for some mattress configurations. To facilitate the local bending of the sheet margins, balls located closest to the margins (e.g. ball 27" of FIG. 9 located on the right) and situated between branches 57 and 57' contribute and cooperate in preventing undesirable local deformations of either sheet margin. Special provisions must be made for the insertion and hence the presence of tubes 97, if those are required.

At set intervals, as sheet 20 advances, tube 97 end segments having a quasi-diamond shaped cross-section such as 42 are laid down on the adhesive side of the sheet, in the margin area where balls are not present. Such technique, well known in the art, is not shown, but is briefly described below. A tube-segment dispenser is located on either side of sheet 20 and its dispensing function is accomplished by means well known to those familiar with the art. The tube segments are long enough to provide an adequate insertion length,i.e. sheet margin width or diamond-shaped portion 42 length, plus a circular stub portion 76 for subsequent connection with a collecting tubular manifold, as the mattress application and use might require. To accommodate the protruding lengths of portions 76, the shape of the half-circular curved end of the U-shaped guide can be modified as shown in dotted lines by profile 59, representing an enlargement and concomitant elongation of the extending closed side of guide 56. Profile 59 opening flares out as shown in FIG. 9 to accommodate the gradual shape variation of branches 57 and 57' of the guide from contour 56 (entrance) to contour 58 (exit). Diamond-shaped portion 42 facilitates the rolling of wheels 93 and 94, while insuring that sealing seams 95, 95' and 95" along the sheet margins and/or portions 42 of the tubes are continuous and form a strong bond.

Finally, two application-related aspects of the fabrication method should now be briefly discussed together, being somewhat inter-related: (1) providing the means for creating built-in anisotropic strength and stretching characteristics to the sheets, and (2) providing the means for building connecting structural elements that link the two sheets, as do filamentary attachments in some inflatable light-weight space structures. The simplest type of deformation corresponds to that of a spherical surface having an adjustable radius of curvature. This type of deformation is obtained whenever the isotropic stretchability of each sheet is different and $\Delta'$ is equal to $\Delta''$. The amount of deformation from a flat shape,i.e. spherical radius, depends on factors well known to those familiar with the art: (1) relative stretchabilities of the sheets and ratio thereof,(2) inflation pressure, (3) mattress thickness, and (4) mean stretchability between the two sheet. The degree of deformability of the mattress structure defines either one or both of the following: (1) the amount of displacement in a direction orthogonal to the deflated flat surface of the mattress which such spherical deformation produces, and (2) the amount of force that the structure can exert in that direction if the mattress is urged to remain flat, regardless of the amount of inflation pressure. Again, readers familiar with the art will know how such displacement-/load characteristics can be utilized for deploying a programmably-shaped structure and/or for actuating some other part deployment, as the use may require.

Shapes other than spherical may be desirable for such structures for specific applications. To such effect, the stretchability of each one of the two sheets can be rendered anisotropic, i.e. different in different directions along the sheet surfaces. This can be accomplished either during the structure fabrication process or after the structure is completed. In any event, reinforcing bands made of a material having a degree of stretchability lower than that of the sheet material are bonded to the external surfaces of either sheet or both. In FIG. 7, portions of such reinforcing bands 109 and 111 are shown in dotted lines and oriented along two orthogonal directions. The bands need not be continuous but may consist of band segments regularly spaced at set intervals. Because they are used when sheets have no holes, i.e. 103 and 104, and for inflatable mattress structures only, band segments may be positioned between rows of ball/sheet contacts where their role is more effective. Readers familiar with the art know that such local reinforcing technique will enable the structure designer to pre-program the shape that the mattress adopts or deploys into when the latter becomes inflated at a preset pressure level, or at a set difference between ambient and inflation pressures. Narrow and elongated mattress strips can be constructed by means of such technique, in which case the mattress strip deformation is unidirectional.

For such use, as a simple example,reinforcing segments could be aligned along two orthogonal directions, e.g. lengthwise on one sheet and widthwise on the other. Assuming that the sheet materials are quite stretchable, whereas that of the band segments is not, inflation will urge the strip to form a coil or apply a torque. Depending on the number of such special articles needed, the application of the reinforcing band segments can be effectuated on completed mattress strips or at a stage of the structure fabrication and ocurring between points m and n of FIG. 1, previously mentioned. The application of self-adhering tapes or segments thereof is well known in the art and needs no further elaboration herein. The mattress strip structures and their reinforcing band bonds can be cured together during a subsequent fabrication stage when the final assembled structures pass between heating plates 51 and 52. In an automatic production process, the application of the reinforcing segments, the formation of the edge seams and of the double transversal seams, the insertion of tubes 97 and then the sectioning off of fully completed individual mattress strips between two adjacent transversal seams can be coordinated and synchronized, as is well known in the art.

As earlier mentioned, in applications where the shells only play the role of spacers between the two sheets, i.e. to define the mattress thickness, and where the use takes place in space, the shells must be reduced upon structure completion to a state of elongated deflated bladders. The shell structure is made of porous strong, flexible but inextensible material, and is given the natural shape of a sphere. The spherical shells are coated with a resin-type film applied on the shell outer surface. The film is not permeable and isolates the shell gaseous content from the outside. A coated shell is thus enabled to behave like an inflated ball or bladder. The film resin is selectively soluble in a solvent that does not react with materials entering the sheet and bonding compositions. After the mattress structure is completed, the solvent is introduced inside the mattress and is enabled to dissolve the resin or render the film coating porous. The solvent is then flushed out and vacuum is then applied by means of tubes 97. The content of the shells is then evacuated and the atmospheric pressure applied on the mattress outer surfaces causes the collapse of the mattress structure. At this stage, one or more inflation and evacuation cycles can be sequentially programmed to insure that: (1) the inner walls of the structure are dry and untacky, (2) the mattress skins assume their correct shapes and relative positions (mattress thickness), and (3) the mattress is ready for final compacting and packaging. Readers familiar with the art will know that mattress inflation at that stage cannot cause inflation of the shells but rather their collapse under the combined influences of the unidirectional pull exerted by the two sheets and inflation pressure externally applied onto the shells.

In conclusion, the basic embodiment of the present invention and its various construction forms herein described provide both a fabrication method and articles produced thereby. Therefore, it is thought that the fabrication method and the fabricated articles of the present invention and many of its attendant advantages will be understood from the foregoing description and discussion and it will be apparent that various changes may be made in the form, construction, fabrication step nature and sequence, and arrangement of the parts thereof without departing from the spirit and scope of the invention or sacrificing any and all of its material advantages, the form hereinbefore described being merely a preferred or examplary embodiment thereof.

Having thus described my invention, I now claim:

1. A method of fabricating a continuous structure having a substantially constant thickness, said structure comprising two parallel sheets between which spherically shaped balls are enclosed and bonded thereto, said balls being programmably positioned and arranged relatively to one another so as to form a one-ball thick layer and be separated from each other by an adjusted set distance, said method comprising the steps of:

dropping the balls of an endless belt in a continuous one-ball thick layer;

causing said layer to pass below a cylindrical surface of a drum located above the belt;

feeding a constant and continuous supply of the balls close to the surface of the drum equipped with means to attract and retain some of said balls at programmed locations on said surface;

attracting balls passing by at programmed locations on said drum surface for positioning and retention thereon;

leaving unattracted balls on the endless belt for evacuation and subsequent re-droppings onto the endless belt;

rotating the drum synchronously with the advancement of a first one of the two sheets, said first sheet having one side coated with an adhesive;

causing said adhesive coated side of the first sheet to come into contact with a point on the ball surface most distant from the drum axis of rotation;

causing a small pressure to be exerted by the first sheet on each ball at said contact point so as to create the start of a bond between each ball and the first sheet coated side;

causing a coated side of the second sheet to come into contact with each ball at a point diametrically opposed to the contact point already created with the first sheet; and curing the bonds created at the sheet-ball contact points so as to strengthen said bonds and eliminate adhesive tackiness.

2. The method recited in claim 1 wherein means is provided for spraying a liquid agent onto the balls and the sheet surfaces at locations where the ball-loaded first sheet and the second sheet come in close proximity prior to contacts being made between the second sheet and the balls, said method comprising the further steps of:

orienting the liquid spray to strike the balls and both inner side surfaces of the sheets simultaneously; and causing the sprayed balls to make contact with the second sheet immediately thereafter.

3. The method recited in claim 2 in which the liquid agent is a product that chemically reacts with the adhesive coating on the surfaces of the parallel sheets for curing said adhesive material after the sheets and the balls have become assembled and for eliminating the tackiness of the adhesive left unused on either surface of the sheets, said method comprising the further steps of:

applying heat on the outer surfaces of the assembled structure for accelerating and advancing the curing of the unused adhesive and of the bonds formed at the ball-sheet interfaces; and enabling the curing to proceed and become completed without additional assistance.

4. The method recited in claim 2 in which the liquid agent is a bonding material that forms a film upon curing for covering the adhesive and forming an additional bond between the balls and the sheets above and around the adhesive contact points, said method comprising the further steps of:

applying heat on the outer surfaces of the assembled structure for curing and drying up the bonding material; and allowing the curing of the bonds to proceed and become completed without additional assistance.

5. The method recited in claim 2 in which the liquid agent contains a selective solvent that reacts with a thin coating applied on the ball outer surfaces so as to render the ball permeable to its gaseous contents, therefore enabling said contents to be evacuated when vacuum is applied inside the structure and outside the balls, said method comprising the further steps of:

enabling the solvent to remove some of the ball coating;

applying heat externally to the assembled structure to cause the solvent to evaporate and enable the curing of the ball-sheet bonds to proceed by means of continued application of heat; and applying vacuum around the completed structure.

6. The method recited in claim 1 in which a plurality of cavities is provided on the drum surface, the cavities being spaced according to a set programmed pattern representative of the pattern in which the balls are to be distributed in the completed structure, wherein means is provided for creating air suction in cavities positioned in a first portion of the drum surface when it is about to face and then faces the adhesive-coated side of the advancing sheet, means is further provided for admitting air under pressure in cavities positioned in a remaining second portion of the drum surface, holes are provided for alternatively connecting each one of said cavities with either one of two enclosed spaces formed between a fixed structure located inside the drum and an inner cylindrical surface of said drum, and rotating brushes are provided along the length of the drum for maintaining the drum and cavity surfaces clean and free of particulate matter, and means is further provided for evacuating the matter thus removed, said method comprising the further steps of:

maintaining a pressure lower than ambient in a first one of the two spaces;

maintaining a pressure higher than ambient in a second one of the two spaces;

causing each cavity and its associated hole to become connected to the first space and subsequently to the second space as the drum rotates;

rotating the brushes at a rate such that the free ends of the brush bristles move faster than the drum surface and cause the removed matter to fly in a direction away from the ball-laden first sheet; and applying air suction in a substantially closed space surrounding the brushes and most of the second portion of the drum external surface so as to dispose of the matter removed off the cavity and drum surfaces, and from the cavity air-feeding holes;

whereby air suction is applied in cavities momentarily connected to the first space and air blowing results in cavities momentarily connected to the second space, air suction creating attraction of balls located in the cavity proximity and then retention thereby, and air blowing facilitating ball expulsion out of the cavities and cleaning of the connecting holes.

7. The method recited in claim 1 in which the adhesive coatings of the first and second sheets form a sealing bond when brought together by an externally local pressure applied on margins located near the edges of each sheet, said margins having remained ball-free so as to enable them to come into contact locally, and in which a plurality of small tubes are inserted between the sheet margins for connecting the structure internal volume to the outside prior to forming a sealing bond seam, said method comprising the further steps of:

placing one end of each tube along the structure edge and between the sheet margins while enabling the other end of each tube to remain outside of the structure;

urging the sheet margins to bend so as to cause the sheet inner side surfaces to come into contact with themselves and with the outer surface of the inserted portions of the tubes; and applying pressure on said margins along a band extending around the sheet edges so as to form a continuous bonding seam for sealing the internal volume of the structure, while enabling communication between said structure internal volume and the tube internal volumes.

* * * * *